United States Patent
Romanovskiy (10) Patent No.: US 7,725,879 B2
(45) Date of Patent: May 25, 2010

(54) METHOD AND APPARATUS FOR EXECUTING INSTRUCTIONS OF JAVA VIRTUAL MACHINE AND TRANSFORMING BYTECODE

(75) Inventor: Alexey Romanovskiy, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1079 days.

(21) Appl. No.: 11/401,403

(22) Filed: Apr. 11, 2006

(65) Prior Publication Data

US 2006/0253847 A1    Nov. 9, 2006

(30) Foreign Application Priority Data

Apr. 21, 2005    (KR) .................. 10-2005-0033235

(51) Int. Cl.
G06F 9/44 (2006.01)
G06F 9/45 (2006.01)

(52) U.S. Cl. .................. 717/118; 717/115; 717/136

(58) Field of Classification Search ......... 717/114–118, 717/162, 136–139
See application file for complete search history.

(56) References Cited

U.S. PATENT DOCUMENTS

| | | | | |
|---|---|---|---|---|
| 5,875,335 A * | 2/1999 | Beard | | 717/139 |
| 5,887,172 A * | 3/1999 | Vasudevan et al. | | 719/328 |
| 6,011,918 A * | 1/2000 | Cohen et al. | | 717/106 |
| 6,081,665 A * | 6/2000 | Nilsen et al. | | 717/116 |
| 6,139,199 A * | 10/2000 | Rodriguez | | 717/159 |
| 6,154,877 A * | 11/2000 | Ramkumar et al. | | 717/114 |
| 6,205,578 B1 * | 3/2001 | Grove | | 717/118 |
| 6,233,733 B1 * | 5/2001 | Ghosh | | 717/118 |
| 6,256,784 B1 * | 7/2001 | Grove | | 717/139 |
| 6,282,698 B1 * | 8/2001 | Baker et al. | | 717/118 |
| 6,324,688 B1 | 11/2001 | Brown et al. | | |
| 6,560,774 B1 * | 5/2003 | Gordon et al. | | 717/146 |
| 6,775,680 B2 * | 8/2004 | Ehrman et al. | | 707/102 |
| 6,865,730 B1 * | 3/2005 | Burke et al. | | 717/116 |
| 6,993,751 B2 * | 1/2006 | Bhansali et al. | | 717/137 |
| 7,137,107 B1 * | 11/2006 | Brown | | 717/137 |
| 7,171,655 B2 * | 1/2007 | Gordon et al. | | 717/146 |
| 7,225,037 B2 * | 5/2007 | Shani | | 700/18 |

(Continued)

FOREIGN PATENT DOCUMENTS

JP    8-286911 A    11/1996

(Continued)

OTHER PUBLICATIONS

Binder et al, "Reengineering standard Java runtime system through dynamic bytecode instrumentation", IEEE, pp. 91-100, 2007.*

(Continued)

*Primary Examiner*—Anil Khatri
(74) *Attorney, Agent, or Firm*—Sughrue Mion, PLLC (57) ABSTRACT

A method and apparatus for executing an instruction of a Java virtual machine are provided. The method includes extracting a bytecode of a method of a Java class, transforming the bytecode into a second code which comprises information regarding a location of an opcode handler and uses 16-bit memory elements, the opcode handler performing an operation corresponding to an opcode included in the bytecode, and executing the second code.

15 Claims, 8 Drawing Sheets

U.S. PATENT DOCUMENTS

| | | | |
|---|---|---|---|
| 7,269,822 B2 * | 9/2007 | Gebhart et al. | 717/114 |
| 7,287,243 B2 * | 10/2007 | Dollin et al. | 717/126 |
| 7,308,680 B2 * | 12/2007 | Grover et al. | 717/114 |
| 7,434,209 B2 * | 10/2008 | Brown et al. | 717/136 |
| 7,574,692 B2 * | 8/2009 | Herscu | 717/116 |
| 2003/0041322 A1 | 2/2003 | Sokolov | |
| 2004/0015911 A1 | 1/2004 | Hinsley et al. | |
| 2004/0088703 A1 | 5/2004 | Fresko et al. | |

FOREIGN PATENT DOCUMENTS

| | | |
|---|---|---|
| JP | 11-175349 A | 7/1999 |
| JP | 2001-056764 A | 2/2001 |
| JP | 2001-56764 A | 2/2001 |
| JP | 2003-50844 A | 3/2003 |
| KR | 10-2003-0094028 A | 12/2003 |
| KR | 10-2004-0068653 A | 8/2004 |
| KR | 10-2004-0076048 A | 8/2004 |

OTHER PUBLICATIONS

Zhao et al, "Data flow based analysis of Java bytecode vulnerability", IEEE, pp. 647-653, 2008.*

Schultz et al, "Compiling Java for low end embedded systems", ACM LCTES, pp. 42-50, 2003.*

Badea et al, "A simplified Java bytecode compilation system for resources constrained embedded processors", ACM Cases, pp. 218-227, 2007.*

Azevedo et al, "High performance annotation aware JVM for Java cards", ACM EMSOFT, pp. 52-61, 2005.*

Kabanov et al, "Embedded typesafe domain specific languages for Java", ACM PPPJ, pp. 189-197, 2008.*

* cited by examiner

| 0x2A | 0xB4 | 0x00 | 0x12 | 0xBD | 0x00 | 0x66 | 0xB5 | 0x00 | 0x67 | 0x03 | 0x3c |
|------|------|------|------|------|------|------|------|------|------|------|------|
| aload_0 | getfield | indexbyte1 | indexbyte2 | anewarray | 0 | 66 | putfield | 0 | 67 | iconst_0 | istore_1 |

METHOD AND APPARATUS FOR EXECUTING INSTRUCTIONS OF JAVA VIRTUAL MACHINE AND TRANSFORMING BYTECODE

CROSS-REFERENCE TO RELATED APPLICATIONS

This application claims priority from Korean Patent Application No. 10-2005-0033235 filed on Apr. 21, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to executing an instruction of a Java virtual machine, and more particularly, to executing an instruction of a Java virtual machine in which bytecode executed in a Java virtual machine is transformed into a second code using 16-bit memory elements, thereby considerably improving the speed of executing instructions.

2. Description of the Related Art

Although Java programming language has rapidly proliferated as a standard object-oriented programming language since its advent in the mid-1990s, it has several disadvantages, including a lower execution speed than the C programming language or the C++ programming language. In order to speed up the execution of the Java programming language, a dynamic code generation system, such as a Java virtual machine adopting a just-in-time (JIT) compiler, and a static code generation system, such as a Java virtual machine adopting an ahead-of-time (AOT) compiler, have been developed.

A Java platform consists of a Java virtual machine and a plurality of classes. Each class consists of information corresponding to a data structure of the class, field information, and method information. Execution code of a method is written in bytecodes independent of a hardware device or an operating system.

Conventional Java virtual machines can be classified into interpreter-type Java virtual machines, JIT compiler-type Java virtual machines, interpreter-and-JIT compiler-type Java virtual machines, and AOT compiler-type Java virtual machines according to the types of their respective execution engines.

An interpreter-type Java virtual machine interprets a plurality of bytecodes of a method to be executed one by one, and executes an application program of the method.

A JIT compiler-type Java virtual machine compiles the bytecodes of the method to obtain machine codes dependent upon a Java platform, and executes the machine codes to execute the application program of the method.

Figure 1:
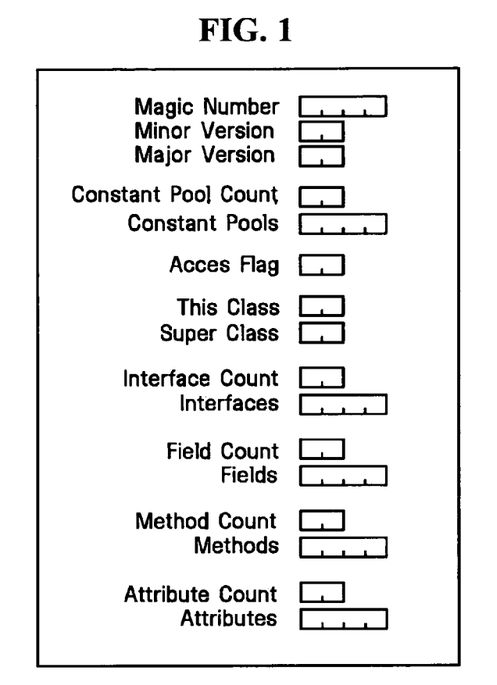
FIG. 1 is a diagram illustrating a structure of a conventional Java class file.

FIG. 1 is a diagram illustrating a structure of a conventional Java class file.

Referring to FIG. 1, the Java class file includes a class or interface definition and is comprised of various attributes, field information, method information and so on that are defined in the class. The method information defines a byte stream, which is called a bytecode and can be executed in the interpreter. This bytecode can be obtained from compiling a file (e.g., a file having an extension of "java") containing a Java source language statement.

The bytecode is similar to a program module ready for execution because the bytecode is executed within a computer one byte at a time. However, the instructions of the bytecode are actual instructions transmitted to the logical and abstract Java virtual machine. The bytecode can be compiled again by the JIT compiler so that the bytecode can be compatible with a particular system platform. This also ensures that the byte code is interpreted by one byte only once, thereby accelerating the execution speed of the Java program.

Figure 2:
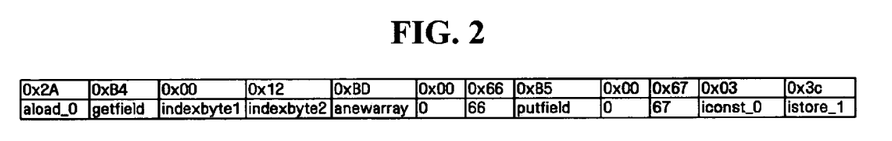
FIG. 2 illustrates a bytecode to be executed in a conventional Java virtual machine.

FIG. 2 illustrates a bytecode to be executed in a conventional Java virtual machine.

Referring to FIG. 2, the instructions of the bytecode are composed of an operand and an opcode, both of which have a size of one byte to discriminate performed operations. One opcode may include several operands. Both the opcode and each operand are stored in the unit of one byte, so that they are represented as consecutive bytes in order to represent the operands having a size of one or more bytes. For example, a 16-bit value consists of two consecutive bytes, and a 32-bit value consists of four consecutive bytes.

In FIG. 2, the first line denotes the hexadecimal values of the actual bytecode, and the second line denotes the bytecode divided into opcodes and operands.

Figure 3:
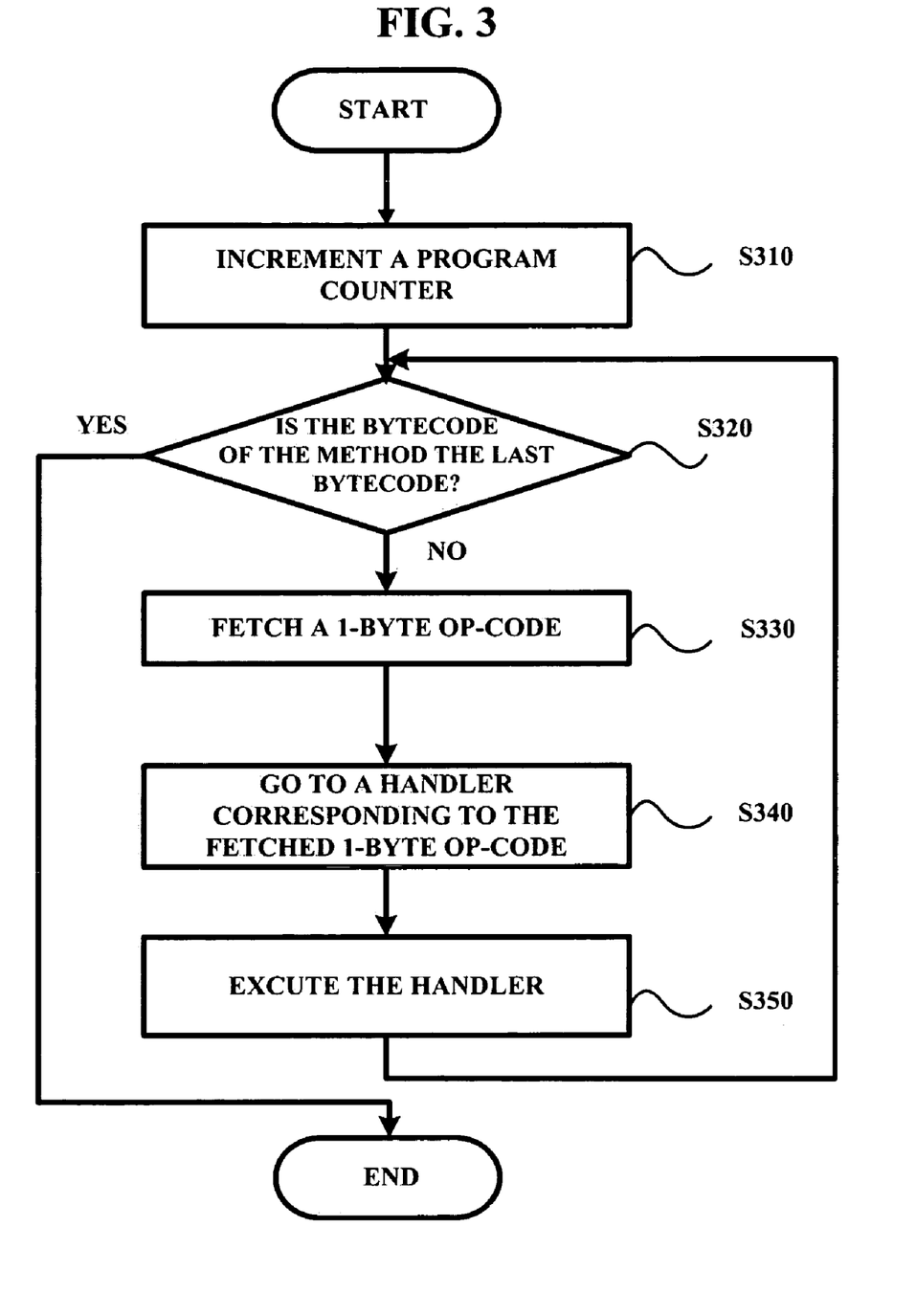
FIG. 3 is a flowchart illustrating a method of executing each instruction code performed by a conventional Java interpreter.

FIG. 3 is a flowchart for explaining a method of executing each instruction code performed by a conventional Java interpreter.

An application class is loaded by a class loader of a Java virtual machine and goes through a linking process and an initialization process, and then associated information is stored in a data structure within a runtime system, and the method is executed by the execution engine such as an interpreter or a JIT compiler.

In a typical interpreter, the bytecode is executed in the manner shown in FIG. 3. When a method is invoked in the interpreter, a program counter indicating the bytecode of the method is incremented (S310). Next, it is determined whether the bytecode of the method is the last bytecode (S320). If it is determined that the bytecode of the method is not the last bytecode (NO in operation S320), a one-byte opcode is fetched (S330). Subsequently, the control goes to a handler corresponding to the fetched one-byte opcode using a switch statement in the program (S340), so that the handler is executed (S350). This process is repeated as many times as necessary depending on the size of the bytecode, and then the interpreting process for the method is terminated.

The process shown in FIG. 5 can be represented with a pseudo-code as follows:

```
Loop {
    Op = *pc++;
    switch (Op) {
        case op_1:
            // op_1's implementation
            break;
        case op_2:
            // op_2's implementation
            break;
        case op_3:
            // op_3's implementation
            break;
        ...
    }
```

In the handler for the respective opcodes, if the data size of the operand required by the opcode is larger than one byte, the values of the operand are stored in consecutive bytes. Thus, the consecutive bytes are reconstructed into one significant value through an OR operator and a Shift operator according to each bit. For example, in a central processing unit (CPU) using the "little-endian" format, if operands required by a certain opcode A are in subsequent bytes byte1, byte2, byte3 and byte4, then byte4 represents the first bit to the eighth bit of a 32-bit value to be logically indicated, byte3 represents the ninth bit to the sixteenth bit of the 32-bit value to be logically indicated, byte2 represents the seventeenth bit to the twenty-fourth bit of the 32-bit value to be logically indicated, and byte1 represents the twenty-fifth bit to the thirty-second bit of the 32-bit value to be logically indicated.

Therefore, the 32-bit value actually required by the opcode A can be obtained by an operation like "(byte1<<24)|(byte2<<16)|(byte3<<8)|byte4". In the existing Java virtual machine, processes for combining such operands occur whenever the method is executed.

For the operand, when the data size of the operand is greater than one byte, the operand will be arranged in consecutive bytes, and the consecutive bytes will be reconstructed through the OR operator and the Shift operator according to each bit whenever the method is executed. This process may function as considerable overhead when the Java program is executed. Therefore, there is a need to improve the performance of the Java virtual machine by overcoming these restraints.

SUMMARY OF THE INVENTION

The present invention provides a method and apparatus for executing an instruction of a Java virtual machine in which the speed of executing Java programs can be enhanced by performing a precomputation operation for transforming bytecode into a second code using 16-bit memory elements before interpretation of the bytecode.

The present invention also provides a method and apparatus for executing an instruction of a Java virtual machine in which bytecode is transformed into a second code using 16-bit memory elements, thus considerably reducing overhead compared to the transformation of bytecode into code requiring a large memory capacity.

According to an aspect of the present invention, there is provided a method of executing an instruction of a Java virtual machine, the method including extracting bytecode of a method of a Java class; transforming the bytecode into a second code which comprises information regarding a location of an opcode handler and uses 16-bit memory elements, the opcode handler performing an operation corresponding to an opcode included in the bytecode; and executing the second code.

According to another aspect of the present invention, there is provided a Java virtual machine including a bytecode extraction unit which extracts a bytecode of a method of a Java class, a second code transformation unit which transforms the bytecode into a second code which comprises information regarding a location of an opcode handler and uses 16-bit memory elements, the opcode handler performing an operation corresponding to an opcode included in the bytecode, and an instruction execution unit which executes the second code.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 4:
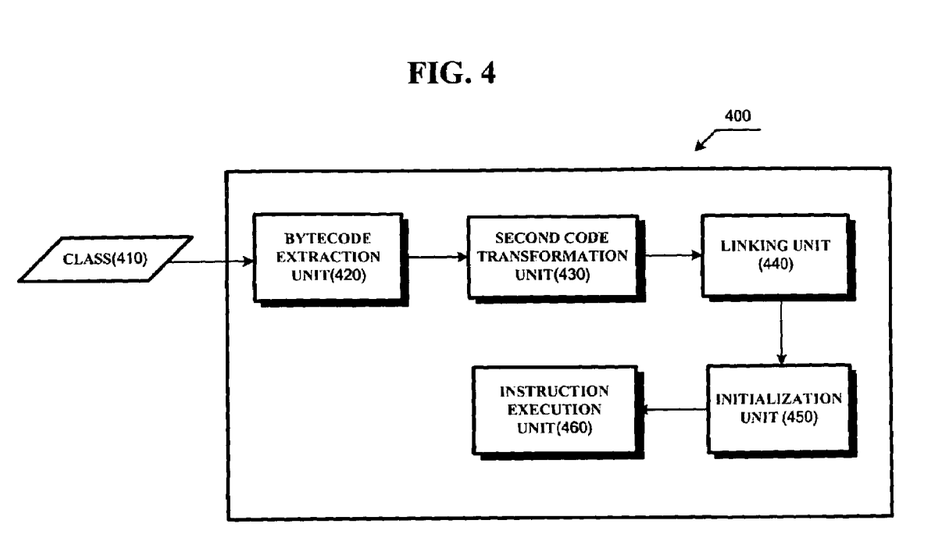
FIG. 4 is a block diagram of a Java virtual machine according to an exemplary embodiment of the present invention.

FIG. 4 is a block diagram of a Java virtual machine 400 according to an exemplary embodiment of the present invention.

Referring to FIG. 4, the Java virtual machine 400 according to an exemplary embodiment of the present invention includes a bytecode extraction unit 420, a second code transformation unit 430, a linking unit 440, an initialization unit 450, and an instruction execution unit 460.

The bytecode extraction unit 420 extracts bytecode of a method from a class 410 loaded into the Java virtual machine 400 and provides the bytecode to the second code transformation unit 430.

The second code transformation unit 430 transforms a bytecode, which is written in units of eight bits, into a second code using 16-bit memory elements. The transforming of the bytecode into the second code may include transforming opcode of the bytecode into a 16-bit opcode handler offset; and, if the opcode includes an operand, transforming the 16-bit opcode handler offset into a 16-bit or 32-bit index or memory address by appropriately combining bits of the operand. The transforming of the bytecode into the second code will later be described in further detail with reference to FIGS. 6 through 10.

The linking unit 440 performs a linking operation, including verification of the transformed second code, preparation and resolution, and combines the result of the linking operation into a runtime state of the Java virtual machine 400.

The initialization unit 450 initializes the linked second code by executing a static initializer and an initializer for a static field declared in the class 410. An interpreter-type Java virtual machine interprets a plurality of bytecodes of a method to be executed one by one, and executes an application program of the method.

The instruction execution unit 460 interprets and executes the result of the initialization operation. In one exemplary embodiment of the present invention, the instruction execution unit 460 may be an interpreter. In an alternative exemplary embodiment of the present invention, the instruction execution unit 460 may be a compiler. A JIT compiler-type Java virtual machine compiles the bytecodes of the method to obtain machine codes dependent upon a Java platform, and executes the machine codes to execute the application program of the method.

The term "module", as used in FIG. 4, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. The functionality provided for in the components and modules may be combined into fewer components and modules or further separated into additional components and modules. In addition, the components and modules may be implemented such that they execute one or more computers in a communication system.

Figure 5:
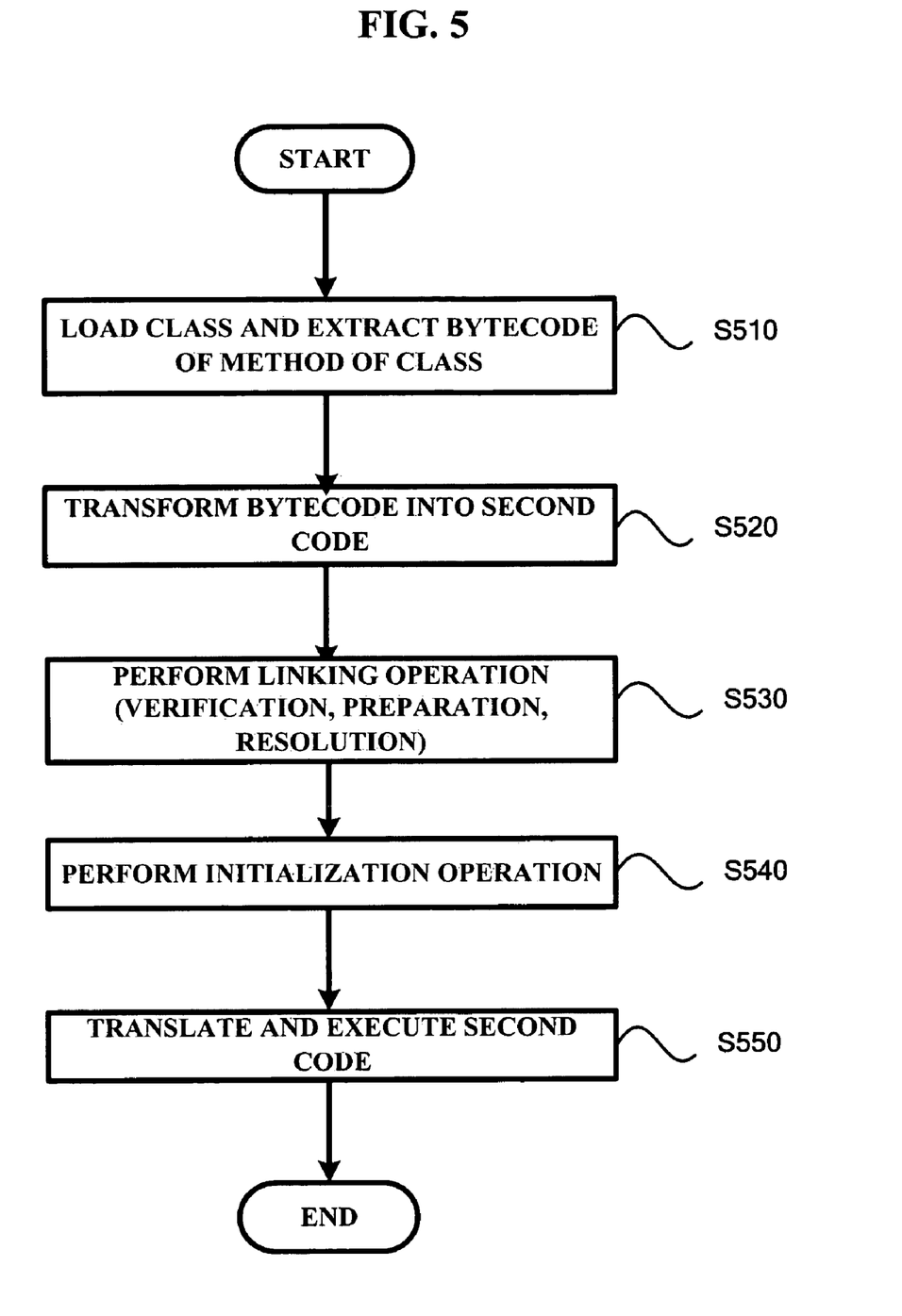
FIG. 5 is a flowchart illustrating a method of executing an instruction by the Java virtual machine shown in FIG. 4.

FIG. 5 is a flowchart illustrating a method of executing an instruction by the Java virtual machine shown in FIG. 4.

Referring to FIGS. 4 and 5, when the class 410 is loaded into the Java virtual machine 400 by a class loader, the bytecode extraction unit 420 extracts bytecode for executing a method from the class 410 in operation S510. In operation S520, the second code transformation unit 430 transforms the extracted bytecode into a second code using 16-bit memory elements. In operation S530, the linking unit 440 performs a linking operation on the second code and combines the result of the linking operation into a runtime state of the Java virtual machine 400. Here, the linking operation includes verification, preparation and resolution. In operation S540, the initialization unit 450 initializes the linked second code by executing a static initializer and an initializer for a static field declared in the class 410. In operation S550, the instruction execution unit 460 translates or compiles the initialized second code into a machine language and then executes the machine language.

Figure 6:
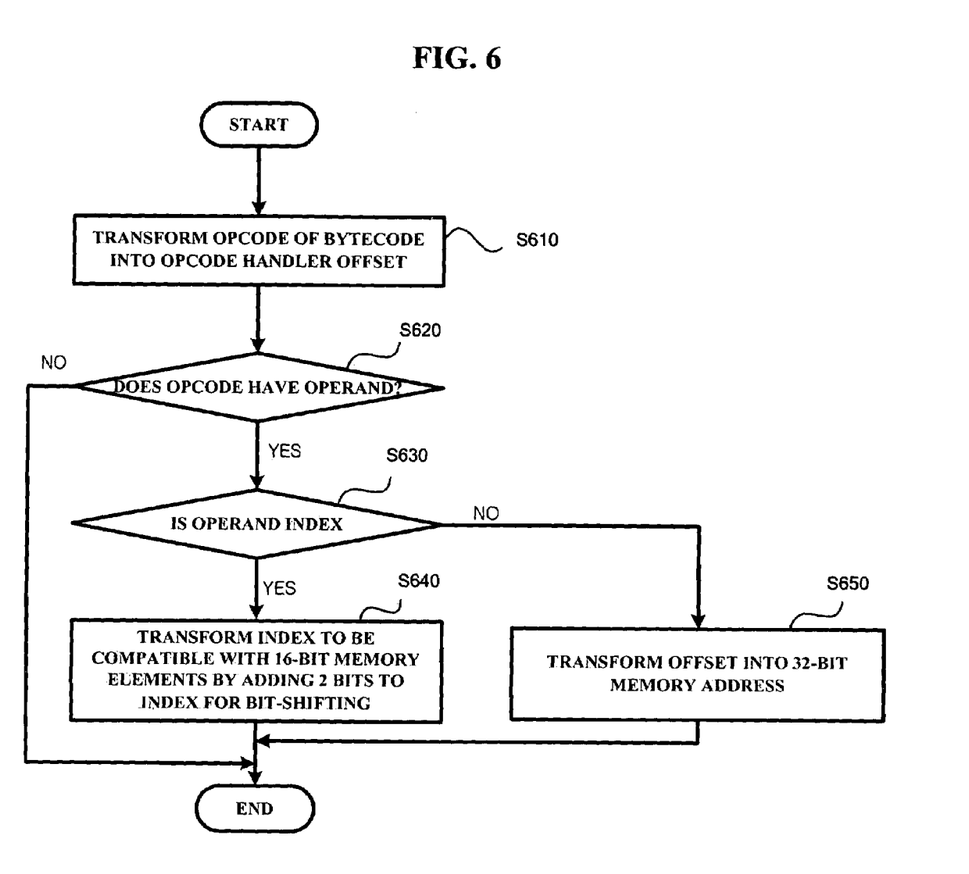
FIG. 6 is a flowchart illustrating an operation of transforming a bytecode into second code shown in FIG. 5.

The transforming of the byte-code into the second code (operation S520 of FIG. 5) will now be described in more detail with reference to FIG. 6.

As described above with reference to FIG. 2, the bytecode is composed of an operand and an opcode. The bytecode is transformed into the second code in the following manner.

In operation S610, a one-byte (eight-bit) opcode is replaced with a 16-bit offset of an associated opcode handler. A memory address of the opcode handler performing the associated opcode function can be obtained by adding an offset value with a predetermined base address. Therefore, if the second code is executed by an interpreter or a compiler, the memory address of the handler can be obtained directly from the opcode handler offset, so that the routine goes to a handler corresponding to the one-byte opcode without a necessity of executing a switch statement in the interpreter loop shown in FIG. 3, thereby shortening the execution time of the Java program.

Next it is determined whether an opcode includes an operand in operation S620. If the opcode includes an operand (YES in operation S620), a one-byte operand is transformed into a 16-bit operand. For example, a one-byte operand is transformed into a signed or unsigned word and then is packed with 16-bits in the second code. A two-byte operand in a bytecode is transformed into a signed or unsigned word and is then packed with two consecutive 16 bits in the second code. A four-byte operand in a bytecode is transformed into a signed or unsigned word and then is packed in the second code as an operand consisting of four consecutive 16 bits.

Next, it is determined whether the operand is an index in operation S630. When the one-byte operand is transformed into the 16-bit operand, the operand may be either an index or an offset value. In the former case (YES in operation S630), the index is transformed to be compatible with 16-bit memory elements in operation S640. In the present invention, 16-bit memory elements are used, and thus, an index value of second code is generated by bit-shifting the index to the left by two bits. An example of the transforming of bytecode having an index as an operand will be described later in further detail with reference to FIG. 7.

In the latter case (NO in operation S630), the offset value is added to a predetermined base address to be transformed into a 32-bit memory address in operation S650. An example of the transforming of bytecode having an offset value as an operand will be described later in further detail with reference to FIGS. 8 and 9.

The process of the second code being translated and executed can be represented with a Pseudo-code as follows:

```
nop_label:
    ++pc; goto *(nop_label+pc[0]);
aconst_null_label:
    *sp=0;
    ++sp;
    ++pc; goto *(nop_label+pc[0]);
...
// other opcode handlers
```

The linking process in the Java virtual machine operation (operation S530 of FIG. 5) is a process of combining the second code into a runtime state of the Java virtual machine using a binary-type class or an interface-type class. In the present exemplary embodiment, the linking process has been described as being performed before the execution of the bytecode or in the middle of the execution of the bytecode.

In the present exemplary embodiment, the transforming of the bytecode into the second code is carried out before the verification of the second code. Thus, the verification of the second code is carried out in consideration of the layout of second code instructions and transforming and pre-computations of instruction operands. A handler offset-opcode lookup table may be used in the verification of the second code to determine what opcode is verified. The format of the handler offset-opcode lookup table will later be described in detail with reference to FIG. 10.

Figure 7:
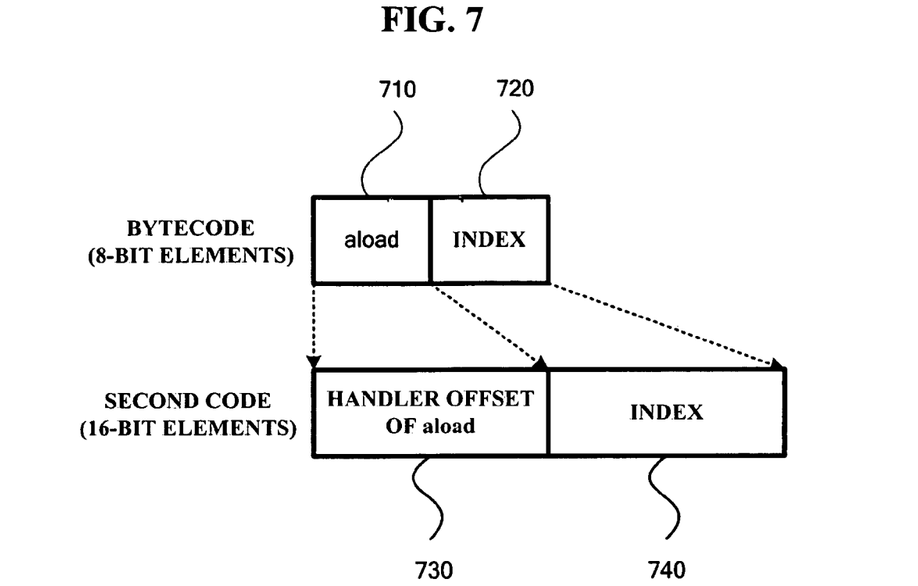
FIG. 7 is a diagram illustrating a method of transforming a bytecode into a second code according to an exemplary embodiment of the present invention.

FIG. 7 is a diagram illustrating a method of transforming a bytecode into second code according to an exemplary embodiment of the present invention;

Referring to FIG. 7, a bytecode instruction, for example, "aload" or "astore", which comprises an eight-bit opcode 710 and an eight-bit operand, i.e., a local variable index 720, is transformed into second code consisting of a 16-bit opcode handler offset 730 and a 16-bit operand 740. If a target processor provides only byte-addressing mode, the 16-bit operand 740 may have a local variable index which is bit-shifted to the left by two bits.

Figure 8:
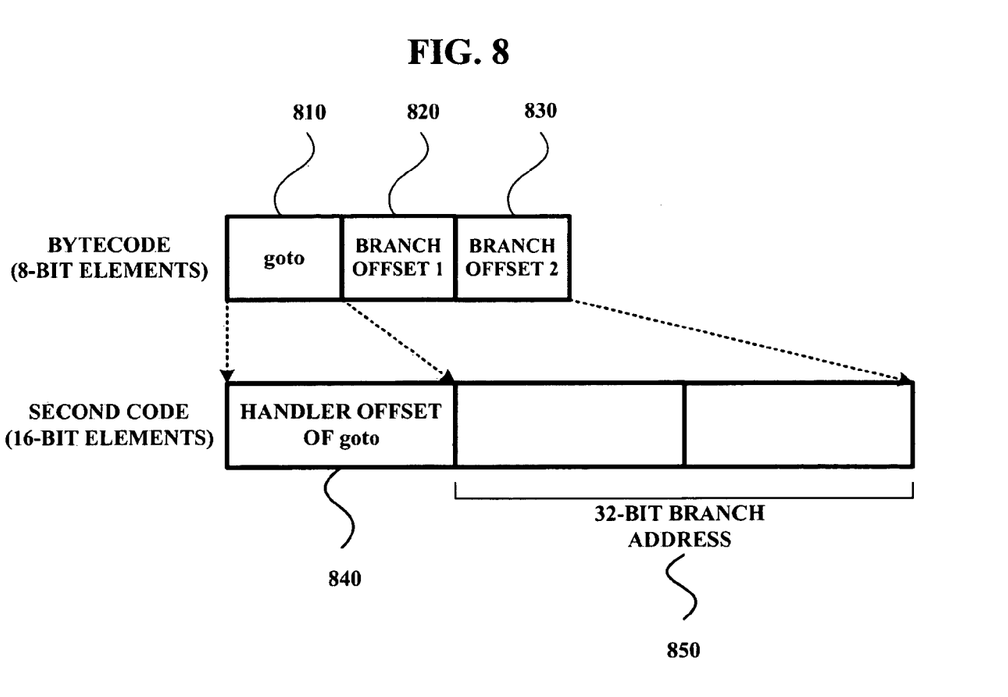
FIG. 8 is a diagram illustrating a method of transforming a bytecode into a second code according to another exemplary embodiment of the present invention.

FIG. 8 is a diagram illustrating a method of transforming a bytecode into second code according to another exemplary embodiment of the present invention.

Referring to FIG. 8, a bytecode instruction, for example, 'goto' or 'if', which comprises an eight-bit opcode 810 and a two-byte operand consisting of first and second branch offsets 820 and 830, is transformed into second code consisting of three 16-bit elements. The three 16-bit elements include a 16-bit opcode handler offset 840 and a 32-bit branch address 850, which is to be used in the execution of the bytecode instruction.

A bytecode instruction, for example, "getfield_quick" or "putfield_quick", which may comprise a eight-bit opcode and a two-byte operand consisting of two field offsets, may also be transformed into a second code consisting of three 16-bit elements. The three 16-bit elements may include an opcode handler offset and a 32-bit field offset consisting of two 16-bit elements. If a target processor provides only byte-addressing mode, 16-bit elements for an operand may include a 32-bit field offset which is bit-shifted to the left by two bits.

A wide operation instruction, for example, "goto_w" or "jsr_w", comprises an eight-bit opcode and a four-byte operand. The transforming of a bytecode into a second code does not distinguish a normal operation from a wide operation. Therefore, the eight-bit opcode of the wide operation instruction is replaced with a handler offset for a normal operation instruction (e.g., "goto"), and two consecutive 16-bit elements are used to generate a 32-bit operand for the four-byte operand.

While the illustrative embodiment has shown that an operand of a second code is a 32-bit address, it will be obvious to those skilled in the art that offsets of the corresponding bytecode may be combined to be transformed into a 32-bit offset value without substantially departing from the principles of the present invention.

Figure 9:
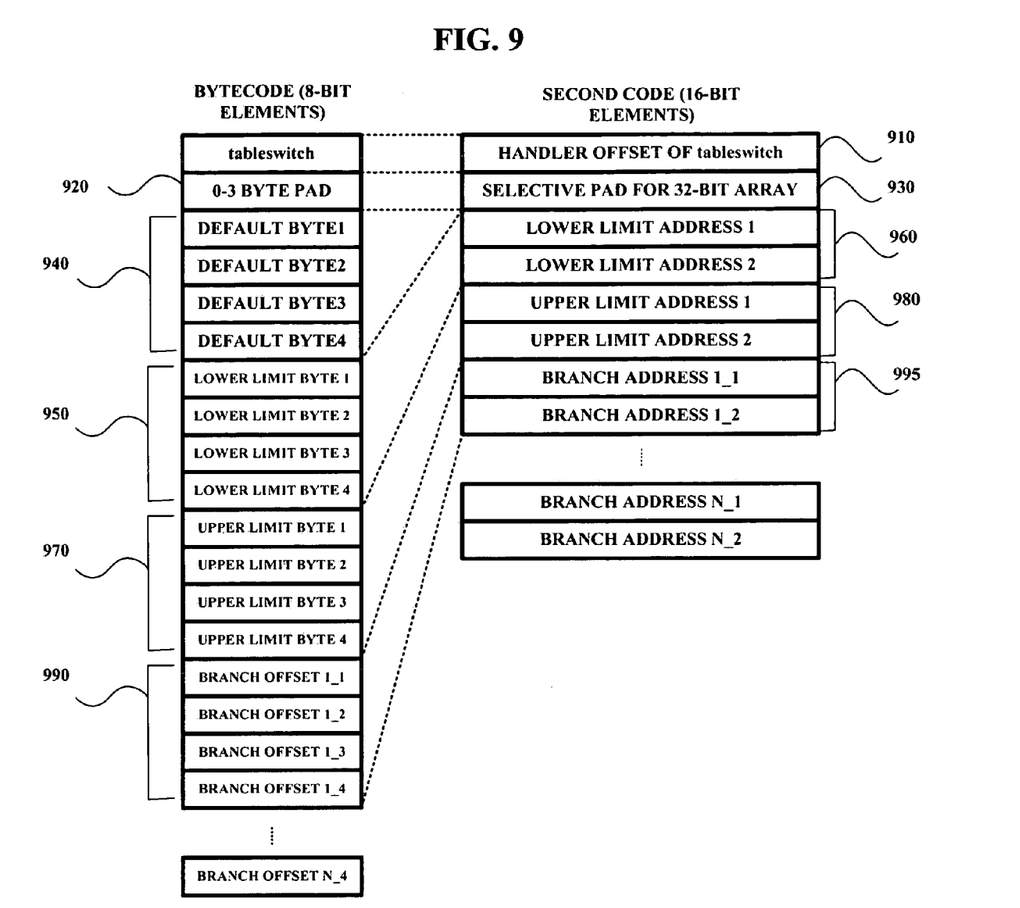
FIG. 9 is a diagram illustrating a method of transforming a bytecode into a second code according to another exemplary embodiment of the present invention.

FIG. 9 is a diagram illustrating a method of transforming a bytecode into second code according to another exemplary embodiment of the present invention.

Referring to FIG. 9, a bytecode instruction "tableswitch", which is comprised of N bytes, may be transformed into a second code instruction which begins with a 16-bit opcode handler offset 910. The 16-bit opcode handler offset 910 is followed by a selective pad 930 for 32-bit array. A lower limit address 960, labeled LOWER LIMIT ADDRESS 1 and LOWER LIMIT ADDRESS 2, is generated by adding a lower limit byte 950, labeled LOWER LIMIT BYTE 1 through LOWER LIMIT BYTE 4, to a default byte 940, labeled DEFAULT BYTE 1 through DEFAULT BYTE 4, and an upper limit address 980, labeled UPPER LIMIT ADDRESS 1 and UPPER LIMIT ADDRESS 2, is generated by adding an upper limit byte 970, labeled UPPER LIMIT BYTE 1 through UPPER LIMIT BYTE 4, to the default byte 940. Every four consecutive branch offsets 990, labeled BRANCH OFFSET 1_1 through BRANCH OFFSET N_4, of the bytecode instruction 'tableswitch' are transformed into 32-bit branch addresses 995, labeled BRANCH ADDRESS 1_1 through BRANCH ADDRESS N_2.

While the illustrative embodiment has shown that an operand of a second code is a 32-bit address, it will be obvious to those skilled in the art that offsets of the corresponding bytecode may be combined to be transformed into a 32-bit offset value without substantially departing from the principles of the present invention.

Figure 10:
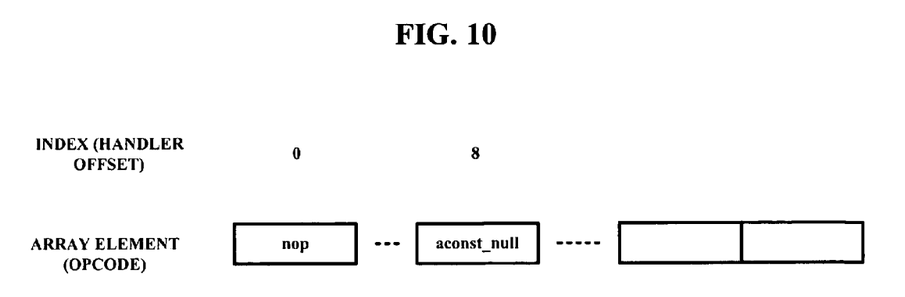
FIG. 10 is a diagram illustrating the format of an opcode handler offset-opcode table according to an exemplary embodiment of the present invention.

FIG. 10 is a diagram illustrating the format of an opcode handler offset-opcode table according to an exemplary embodiment of the present invention.

Referring to FIG. 10, a Java virtual machine uses opcodes sometimes for a predetermined instruction. In this case, a handler offset-opcode lookup table illustrated in FIG. 10 can be used to conveniently look up an opcode corresponding to a predetermined offset. The handler offset-opcode lookup table presents a plurality of opcode handler offsets and respective corresponding opcodes as indexes and array elements, respectively.

In order to compute a stack map for a second code, a Java virtual machine scans a second code instruction. During the scanning operation, the handler offset-opcode lookup table can be used.

As described above, according to the present invention, it is possible to enhance the speed of executing a Java program while considerably reducing the overhead associated with an increase in the memory capacity compared to the transformation of a bytecode into a code requiring a large memory capacity.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method of executing an instruction of a Java virtual machine, the method comprising:
    extracting a bytecode of a method of a Java class stored in a memory;
    transforming the bytecode into a second code which comprises information regarding a location of an opcode handler and uses 16-bit memory elements, the opcode handler performing an operation corresponding to an opcode included in the bytecode; and
    executing the second code, wherein the execution of the second code comprises: linking the second code to a runtime state;
    initializing a result of the linking to be executable; and
    executing a result of the initializing, and
    wherein the transforming of the bytecode comprises transforming an operand of the bytecode into a second operand using 16-bit memory elements by combining consecutive bytes constituting the operand.

2. The method of claim 1, wherein the linking of the second code comprises verifying the second code with reference to a table which comprises the information regarding the location of the opcode handler and the opcode corresponding to the opcode handler.

3. The method of claim 1, wherein the information regarding the location of the opcode handler is an offset of the opcode handler.

4. The method of claim 1, wherein the transforming of the operand of the bytecode comprises shifting the operand of the bytecode to the left by two bits.

5. The method of claim 1, wherein the transforming of the operand of the bytecode comprises:
    combining consecutive bytes constituting the operand by using at least one of an OR operation and a shift operation; and
    shifting a result of the combining to the left by two bits.

6. The method of claim 1, wherein, if the operand of the bytecode is an offset, the second operand is obtained by adding the offset to a base address.

7. The method of claim 1, wherein if opcode of the bytecode uses a wide operand, the transforming of the bytecode comprises transforming the opcode without using the wide operand.

8. A Java virtual machine comprising:
- a bytecode extraction unit which extracts a bytecode of a method of a Java class;
- a second code transformation unit which transforms the bytecode into a second code which comprises information regarding a location of an opcode handler and uses 16-bit memory elements, the opcode handler performing an operation corresponding to an opcode included in the bytecode;
- an instruction execution unit which executes the second code; a linking unit which links the second code into a runtime state; and an initialization unit which initializes the linked second code to be executable,
- wherein the bytecode extraction unit, the second code transformation unit, and the instruction execution unit are stored in a memory and execute on a processor, and wherein the second code transformation unit transforms an operand of the bytecode into a second operand using 16-bit memory elements by combining consecutive bytes constituting the operand.

9. The Java virtual machine of claim 8, wherein the linking unit verifies the second code with reference to a table which comprises the information regarding the location of the opcode handler and the opcode corresponding to the opcode handler.

10. The Java virtual machine of claim 8, wherein the information regarding the location of the opcode handler is an offset of the opcode handler.

11. The Java virtual machine of claim 8, wherein the second code transformation unit shifts an operand of the bytecode to the left by two bits.

12. The Java virtual machine of claim 8, wherein if the operand of the bytecode is an offset, the second operand is obtained by adding the offset to a base address.

13. The Java virtual machine of claim 8, wherein the second code transformation unit combines consecutive bytes constituting the operand of the bytecode using at least one of an OR operation and a shift operation, and shifts a result of the combining to the left by two bits.

14. The Java virtual machine of claim 8, wherein if the opcode of the bytecode uses a wide operand, the second code transformation unit transforms the opcode without using the wide operand.

15. A computer readable medium having a computer readable program recorded therein, the program for executing a method of executing an instruction of a Java virtual machine, the method comprising:
- extracting a bytecode of a method of a Java class;
- transforming the bytecode into a second code which comprises information regarding a location of an opcode handler and uses 16-bit memory elements, the opcode handler performing an operation corresponding to an opcode included in the bytecode; and
- executing the second code, wherein the execution of the second code comprises: linking the second code to a runtime state;
- initializing a result of the linking to be executable; and
- executing a result of the initializing, and wherein the transforming of the bytecode comprises transforming an operand of the bytecode into a second operand using 16-bit memory elements by combining consecutive bytes constituting the operand.

* * * * *